Sept. 17, 1957  G. L. FERNSLER  2,806,651
PULSE AMPLITUDE ANALYZER
Filed Feb. 1, 1954  2 Sheets-Sheet 1
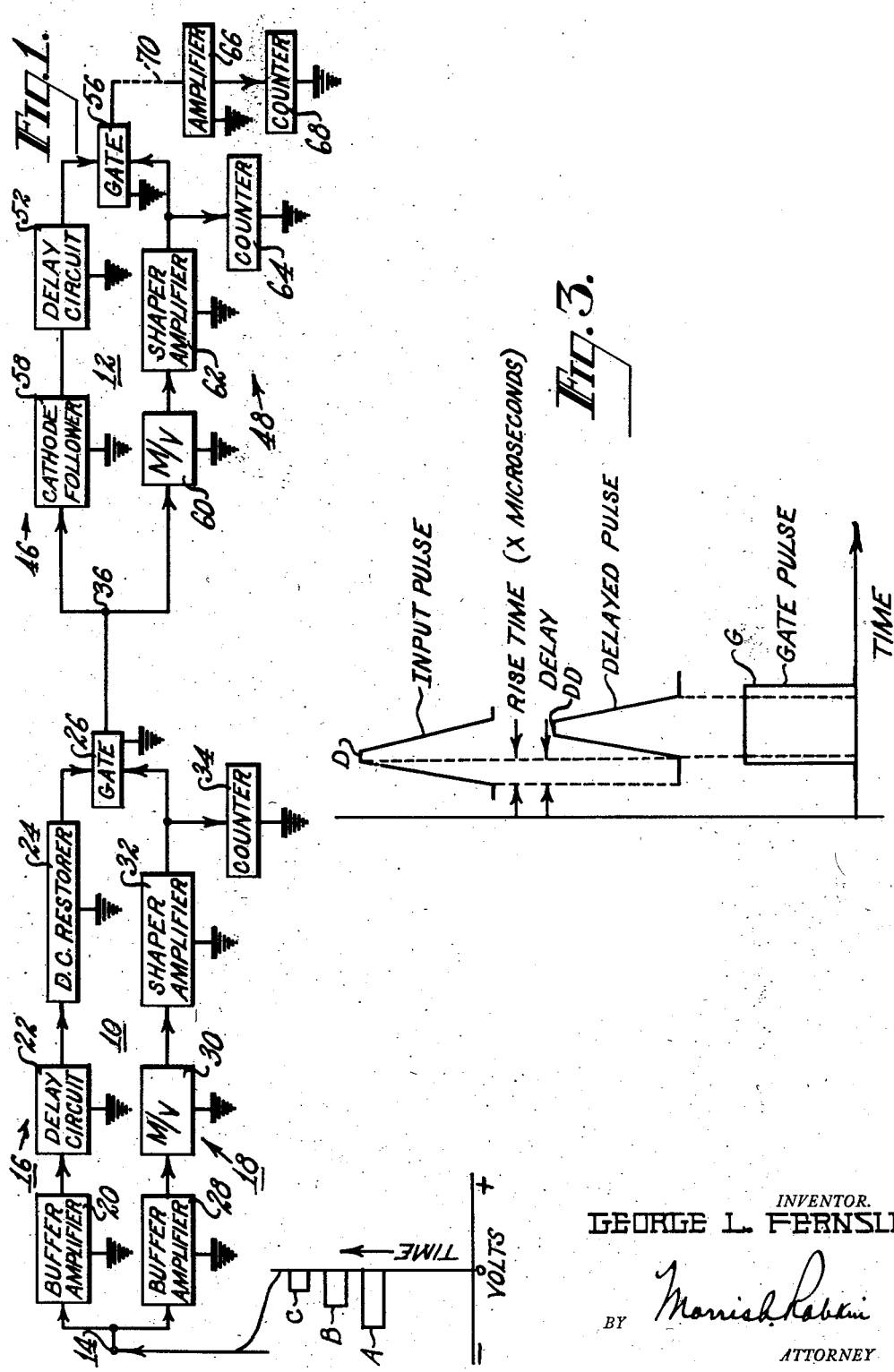
INVENTOR.
GEORGE L. FERNSLER
BY *Morris L. Rabin*
ATTORNEY Sept. 17, 1957
G. L. FERNSLER
2,806,651
PULSE AMPLITUDE ANALYZER
Filed Feb. 1, 1954
2 Sheets-Sheet 2
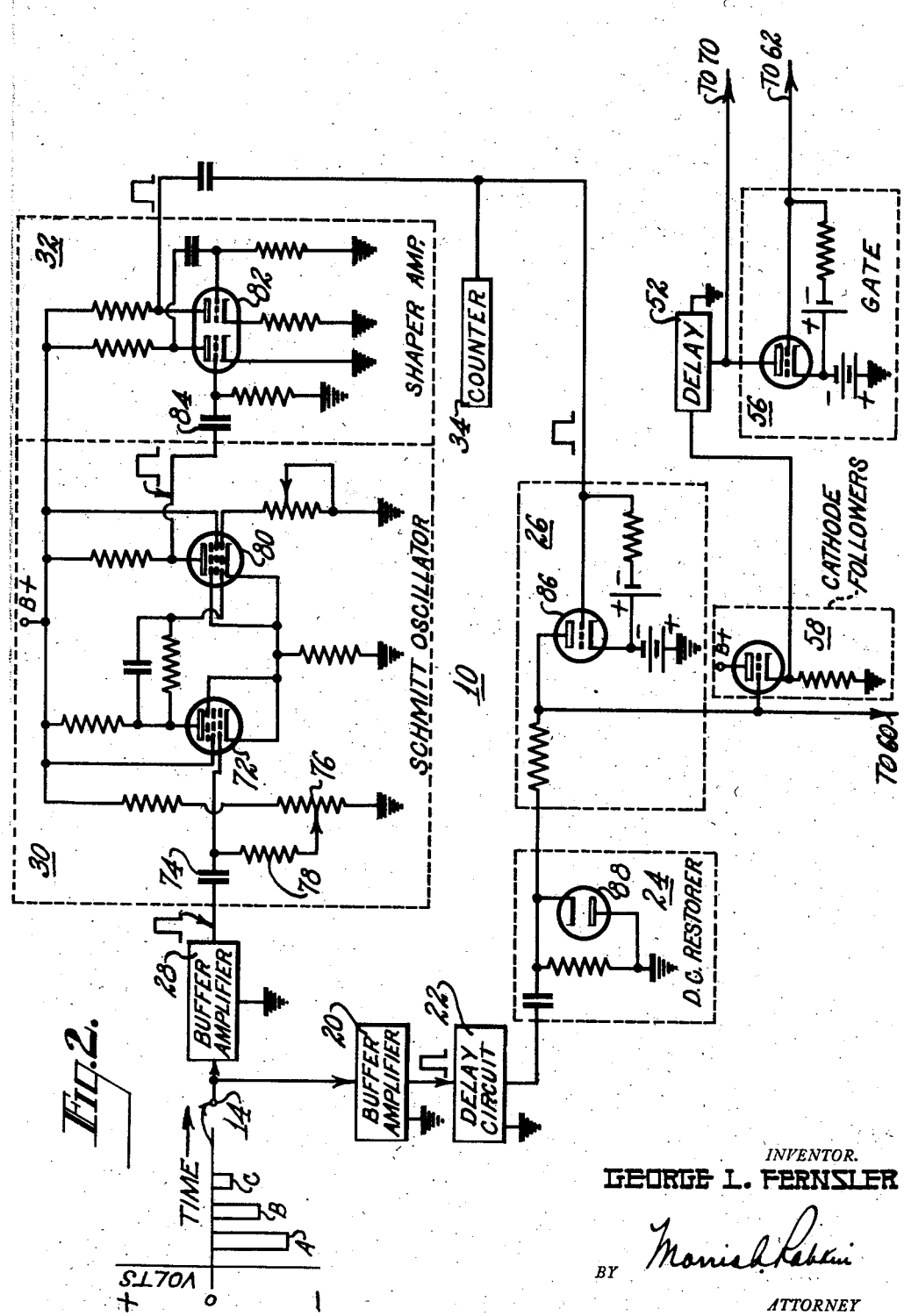
INVENTOR.
GEORGE L. FERNSLER
BY *Morris␣␣␣*
ATTORNEY

United States Patent Office 2,806,651
Patented Sept. 17, 1957

2,806,651

PULSE AMPLITUDE ANALYZER

George L. Fernsler, Pennington, N. J., assignor to Radio Corporation of America, a corporation of Delaware Application February 1, 1954, Serial No. 407,325

7 Claims. (Cl. 235—92)

This invention relates generally to pulse amplitude analyzers. More particularly, though not exclusively, this invention relates to apparatus for sorting and counting a series of pulses of different amplitudes for the purpose of determining the distribution of these pulses in amplitude. While neither specifically nor exclusively limited thereto, the pulse amplitude analyzer of the present invention is particularly useful in sorting and counting random pulses provided by a scintillation detector when exposed to the products of nuclear disintegration.

In several fields of investigation, particularly in that field of nuclear physics wherein beta ray and gamma ray spectra are of importance, it is necessary to analyze the amplitude distribution of a long series of pulses. In nuclear work, these pulses may be derived from the output of a photomultiplier as a result of scintillations caused by the energetic nuclear particles incident upon a fluorescent crystal, such as anthracene, sodium iodide, and the like.

Many types of pulse amplitude analyzers have been proposed for sorting and counting random pulses in a train of pulses. In most of the types of apparatus proposed, a train of input pulses is applied simultaneously to a number of substantially similar channel circuits connected in parallel. These channel circuits must be interconnected with each other in order to disable all but the particular one triggered by an incoming pulse of predetermined amplitude. Because of these interconnected circuits, necessitated by a plurality of channel circuits connected in parallel, the resultant apparatus is usually bulky and complicated.

It has been proposed, also, to build pulse amplitude analyzers of the type using one or more cathode ray tubes of special construction. Where a single cathode ray tube has been used, a plurality of target anodes have been employed therein to collect selectively currents resulting from pulses of predetermined amplitudes. Where a single target has been employed, it has been proposed to separate pulses of different amplitude by progressively biasing a plurality of these specially constructed cathode ray tubes in a progressive manner. These prior art pulse amplitude analyzers, whether of the parallel channel circuit type or of the type requiring cathode ray tubes of special design and construction, are relatively expensive and complex.

It is, therefore, a principal object of the present invention to provide an improved pulse amplitude analyzer having features which will overcome the above-mentioned disadvantages.

It is another object of the present invention to provide an improved pulse amplitude analyzer which will analyze a series of pulses to provide a measure of their distribution in amplitude.

A further object of the present invention is to provide an improved pulse amplitude analyzer which uses conventional components, and does not require any equipment of special design and/or construction.

Still a further object of the present invention is to provide an improved pulse amplitude analyzer which employs a plurality of substantially similar channel circuits connected in series, whereby the input pulses are applied to the input of the first channel circuit only.

Another object of the present invention is to provide an improved pulse amplitude analyzer which is simple in design and construction, easy to operate, and yet highly efficient in use.

According to the invention, these and other objects and advantages are attained in an improved apparatus for sorting voltage pulses of different amplitudes into separate counters whereby each counter will receive pulses of substantially the same amplitude and count them. The pulse amplitude analyzer comprises a plurality of electronic channel circuits connected to each other in series. The pulses to be sorted and analyzed are applied to the input of the first channel circuit only. Each channel circuit comprises two parallel branches. One of the branches comprises a one-shot multivibrator and the other branch comprises delay means. The multivibrators in the respective branches of the channel circuits are biased progressively less positive. An input pulse of predetermined amplitude will travel from one channel circuit to the next until it encounters a multivibrator whose fixed bias it can overcome. When the multivibrator of a particular channel circuit is triggered, a pulse is sent to a counter and to gating means associated with this channel circuit. The gating means will effectively prevent a pulse from travelling to subsequent channel circuits.

The novel features of the invention, as well as the invention itself, both as to its organization and method of operation, will be understood in detail from the following description when considered in connection with the accompanying drawings in which similar reference numerals refer to similar elements, and in which:

Fig. 1 is a schematic diagram, in block form, of a pulse amplitude analyzer, in accordance with the present invention;

Fig. 2 is a schematic diagram of a portion of the circuits represented in block form in Fig. 1; and Fig. 3 is a group of waveforms used to explain the operation of the pulse amplitude analyzer, in accordance with the present invention.

Referring now to Fig. 1, there is shown a pulse amplitude analyzer, in accordance with the present invention, wherein a plurality of substantially similar channel circuits 10, 12, etc., are connected to each other in series. A train of pulses of different amplitudes is applied to a single input terminal 14 of the first channel circuit 10. The channel circuit 10 comprises two branch circuits 16 and 18 connected to each other in parallel. The branch circuit 16 comprises a buffer amplifier 20 having an input connected to the input terminal 14 and an output connected to a delay circuit 22. The output of the delay circuit 22 is connected to the input of a D. C. restorer 24, and the output of the D. C. restorer 24 is connected to a gate circuit 26. The branch circuit 18, of the channel circuit 10, comprises a buffer amplifier 28 having an input connected to the input terminal 14, and an output connected to the input of a one-shot multivibrator 30. The output of the multivibrator 30 is connected to the input of a shaper amplifier 32. The output of the shaper amplifier is connected to a counter 34 and to the gate 26.

The output of the gate circuit 26 is connected to an input terminal 36 of the channel circuit 12. The channel circuit 12 is substantially similar to the channel circuit 10, and comprises two parallel branches 46 and 48, which are substantially similar to the parallel branches 16 and 18 of the channel circuit 10. The branch circuit 46, of the channel circuit 12, as shown, differs from the branch circuit 16 of the channel circuit 10 in that the branch circuit 46 omits a buffer amplifier and a D. C. restorer. It should be understood, however, that the buffer amplifier 20 in the branch circuit 16 is not absolutely necessary, and that for many applications the buffer amplifier 20 may be eliminated.

The branch circuit 46 of the channel circuit 12 comprises a delay circuit 52 having its input connected to the input terminal 36 of the channel circuit 12 through a cathode follower 58. The output of the delay circuit 52 is connected to the input of a gate circuit 56. The delay circuit 52 of the branch circuit 46, of the channel circuit 12, is substantially similar to the delay circuit 22 of the branch circuit 16 of the channel circuit 10. The cathode follower 58 is provided to prevent feedback between the gate circuits.

The branch circuit 48 of the channel circuit 12 comprises a one-shot multivibrator 60 having an input connected to the input terminal 36 of the channel circuit 12 and an output connected to the input of a shaper amplifier 62. The output of the shaper amplifier 62 is connected to a counter 64 and to an input of the gate circuit 56. The components of the branch circuit 48 of the channel circuit 12 are substantially similar to the branch circuit 18 of the channel circuit 10. A buffer amplifier, for the purpose of preventing the feedback of transient voltages, is not necessary in the branch circuit 48 for most applications of the pulse amplitude analyzer.

The pulse amplitude analyzer of the present invention may comprise a plurality of channel circuits, such as the channel circuit 12, corresponding substantially to the number of channels into which the train of pulses to be analyzed is to be sorted and counted. The output of the next to the last channel amplifier is connected to the input of an amplifier 66, the output of which is connected to a counter 68. The amplifier 66 and the counter 68 will be the last channel for sorting pulses and counting them. The dashed line 70 between the gate circuit 56 and the amplifier 66 represents a plurality of channel circuits connected to each other in series, that is, in the same manner that the channel circuit 10 is connected to the channel circuit 12.

The buffer amplifiers 20 and 28 in the channel circuit 10 are provided to isolate the train of input pulses from the delay circuit 22 and the multivibrator circuit 30. The buffer amplifiers 20 and 28 are also phase inverter circuits when the train of input pulses are negative. A function of the buffer amplifier 20 is to invert negative input pulses. Once the input pulses have been inverted, subsequent phase inverters are not necessary in subsequent channel circuits. It is primarily for this reason that the branch circuit 46 of the channel circuit 12 does not have a buffer amplifier therein.

Referring now to Fig. 2, there is shown the channel circuit 10 of Fig. 1, wherein the circuitry of the D. C. restorer 24, the gate circuit 26, the one-shot multivibrator 30 and the shaper amplifier 32 is shown in greater detail. The cathode follower 58 and the gate circuit 56 of channel circuit 12 are also shown here in detail. The one-shot multivibrator 30 is of the Schmitt oscillator type and is connected in circuit so that a single positive input pulse will produce a single positive output pulse. The output of the buffer amplifier 28 is applied to the control grid of a tube 72 of the multivibrator 30, through a capacitor 74. The control grid of the tube 72 is biased by means of a potentiometer 76 connected in circuit between ground and a source of regulated B+ potential. The movable arm of the potentiometer 76 is connected to the control grid of the tube 72, through a resistor 78. Since the circuitry and the operation of the one-shot multivibrator 30, of the Schmitt oscillator type, is well known in the art, details of its circuitry will not be described. The output of the multivibrator 30 is derived from the anode of a pentode tube 80, and fed to the grid of one triode of a duotriode 82, through a capacitor 84.

It will now be understood that the width of an input pulse applied to the grid of the tube 72 of the multivibrator 30 can be widened by means of the capacitive and resistive coupling between the anode of the tube 72 and the grid of the tube 80, of the multivibrator 30. The widened output pulse from the anode of the pentode 80 of the multivibrator 30 is then applied to the input grid of one of the triodes of the duotriode 82, and a widened square wave pulse is derived from the anode of the other triode of the duotriode 82. This latter pulse is applied to the counter 34 for counting purposes, and to the grid of a triode 86 of the gate circuit 26 for the purpose hereinafter appearing.

The triode 86 of the gate circuit 26 has its grid biased negatively to a point where conduction through the tube 86 is normally cut off. The appearance of a positive-going pulse on the grid of the tube 86, derived from the output of the duotriode 82 of the shaper amplifier 32, is sufficient to cause the triode 86 to conduct. The tube 86 has relatively low plate resistance when conducting so that a positive pulse applied to the grid of the tube 86 will cause the voltage at the anode of the tube 86 to drop substantially. Since it is the anode of the tube 86, of the gate circuit 26, that is connected to the input of the next channel circuit, that is, to the input terminal 36 of the channel circuit 12, a positive pulse on the grid of the tube 86 will cause the input pulse to the input terminal 36 of the channel 12 to be substantially zero.

The D. C. restorer circuit 24, as shown in Fig. 2, comprises a diode 88 connected in a manner to refer all incoming gate pulses to a common axis. A D. C. restorer is necessary only in the first channel circuit.

When the gate circuit 26 is "open," that is, when the tube 86 has not been rendered conductive, pulses from the train of pulses to be analyzed are applied to the anode of a triode in the gate circuit 56, through the cathode follower 58 and the delay circuit 52.

The operation of the pulse amplitude analyzer, in accordance with the present invention will now be described. Let it be assumed that a train of random pulses, comprising pulses of amplitude A, B and C are applied to the single input terminal 14 of the channel circuit 10. Let it also be assumed that the channel circuit 10 has its multivibrator 30 biased to be triggered only by pulses whose amplitudes are greater than that of pulse B. In other words, the multivibrator 30 of channel 10 will be triggered by the pulse A. The bias of the multivibrator 60 is adjusted so that it will be triggered by pulses greater than the pulse C, that is, by pulses B and A. Let it also be assumed that the pulse A is now applied to the input terminal 14. Since the pulse A is a negative pulse, it will be inverted by the buffer amplifiers 20 and 28. The inverted pulse A, which is now a positive pulse will trigger the one-shot multivibrator 30 and an output pulse therefrom will be applied to the shaper amplifier 32. A widened pulse, preferably a widened squarewave, is applied to the grid of the triode 86 of the gate circuit 26. This will cause the tube 86 to conduct, whereby a negative-going voltage, dropping to substantially zero, is applied to the input terminal 36 of the channel circuit 12. Since the inverted pulse A is applied to the delay circuit 22, it is delayed a slight amount and then fed to the D. C. restorer 24 where it is restored to a common axis or reference potential. Since, however, the triode 86 of the gate circuit 26 has been fired by a widened gate pulse from the output of the shaper amplifier 32, the pulse A travelling along the branch circuit 16 of the channel 10 will not be applied to the input terminal 36 of the channel circuit 12 because the gate circuit 26 may be said to be "closed." In this latter condition, no pulse is transmitted to subsequent channel circuits. Thus, it will be seen that a pulse of amplitude A will travel through the branch circuit 18 of the channel 10 and be counted on the counter 34, and close the gate 26. The same pulse A travelling through the branch circuit 16 of the channel 10 will be blocked at the gate 26 because the tube 86 has been fired and the anode voltage at the tube 86 is a negative-going pulse of insufficient amplitude to trigger the multivibrator in the subsequent channel circuit.

The function of the delay circuit 22, which may be a delay line or other equivalent delay circuit, is to delay the pulse to the anode of the triode of the gate circuit 26 by a time factor equal to, or slightly greater than, the maximum rise time of any of the input pulses. This will provide for complete gating of the pulses. Otherwise, it would be possible for a portion of the rise time of an input pulse to trigger a multivibrator in a subsequent channel circuit and thereby false counts would be produced.

While the input pulses A, B and C have been indicated as squarewaves, for the sake of convenience, it is understood that pulses of substantially any shape may be used with the pulse amplitude analyzer of the present invention. Referring now to Fig. 3, let it be assumed that an input pulse D has a rise time of X microseconds. The delay circuit 22 of the channel circuit 10 should then delay the pulse D at least X microseconds so that the delayed pulse DD is applied to the anode of the triode 86 from the delay circuit 22. The gate pulse G, of Fig. 3 should have a time duration equal to the maximum pulse duration time. It is assumed that the maximum duration of the input pulses is known so that the width of the gating pulse G can be adjusted by means of the one-shot multivibrator 30 and the shaping amplifier 32. As explained above, the width of the gating pulse G can be determined by the resistive and capacitive coupling between the anode of the tube 72 and the control grid of the tube 80 of the multivibrator 30, and the capacitive coupling between the anode of one triode to the grid of the other triode of the duotriode 82.

Let it now be assumed that the pulse B of the train of pulses is applied to the input terminal 14 of the channel circuit 10. The amplitude of the pulse B is not sufficient to trigger the multivibrator 30. The pulse B cannot, therefore, travel along the branch circuit 18 of the channel circuit 10. The pulse B can, however, travel along the branch circuit 16 of the channel 10 and pass through the "open" gate 26 to the input terminal 36 of the channel circuit 12. The pulse B will now travel along the parallel branch circuits 46 and 48. The multivibrator 60 will now be triggered by the pulse B and shaped by the shaper amplifier 62. A positive-going pulse from the output of the shaper amplifier 62 is fed to the counter 64 where it is counted. The positive-going output pulse from the shaper amplifier 62 is also fed to the grid of the triode of the gate circuit 56. The gate circuit 56 is substantially similar to the gate circuit 26. Thus, the triode of the gate 56 is made to conduct and a negative-going pulse at the anode thereof, of a magnitude insufficient to trigger subsequent channel circuits, is formed. The positive-going pulse B travelling along the branch circuit 46 of the channel circuit 12 will not be able to pass through the "closed" gate 56, and, consequently, no multivibrator in a subsequent channel circuit will be triggered.

Let it now be assumed that the pulse C is applied to the input terminal 14 of the channel circuit 10. The pulse C is of insufficient amplitude to trigger the multivibrator 30 of the channel circuit 10, or the multivibrator 60 of the channel circuit 12. Consequently, the pulse C will travel along the branch 16 of the channel circuit 10, through the "open" gate 26, and along the branch circuit 46 of the channel circuit 12. The pulse C will pass through the "open" gate 56 and will eventually be applied to the input of the amplifier 66. The amplified pulse C will then be applied to the counter 68 where it will be counted. In actual practice, it might be desirable to bias the last amplifier 66 so that small noise impulses will be cut out and will not be passed on to the counter 68.

Thus, there has been shown and described a pulse amplitude analyzer, in accordance with the objects of the present invention, wherein applied pulses of different amplitudes are sorted into separate channels, and each channel counts pulses of substantially the same amplitude. The pulse amplitude analyzer shown and described comprises a plurality of substantially similar channel circuits connected to each other in series. Each channel circuit comprises a pair of branch circuits connected in parallel. The pulses to be sorted and counted are applied to the input terminal of the first channel circuit only. A respective branch circuit in each channel circuit comprises a multivibrator. Successive multivibrators are biased progressively less positive. Each pulse in a train of pulses travels along a respective parallel branch of the channel circuits until it encounters a multivibrator whose input bias it is able to overcome. Upon triggering a particular multivibrator in a channel circuit, a pulse is sent to a counter and to a gate circuit which will close the gate to subsequent channel circuits. By this arrangement, the pulse that did the triggering is prevented from triggering subsequent channel circuits.

What is claimed is:

1. A pulse amplitude analyzer comprising a plurality of channel circuits each having input means and a gating circuit, each of said gating circuits having input means and output means, said channel circuits being connected in series with each other, each of said channel circuits comprising two branch circuits, each of said branch circuits being connected between said input means of its channel circuit and said input means of the gating circuit of its channel circuit, one of said branch circuits in each of said channel circuits comprising a delay circuit, the other of said branch circuits in each of said channel circuits comprising a monostable multivibrator, means in the first of said channel circuits to restore pulses applied to the input means thereof to a desired polarity and reference voltage level, said output means of each of said gating circuits being the output means of each of said channel circuits, and said input means of each subsequent channel circuit being connected to said output means of its immediately preceding channel circuit.

2. A pulse amplitude analyzer comprising a plurality of channel circuits each having input means and a gating circuit, each of said gating circuits having input means and output means, said channel circuits being connected in series with each other, each of said channel circuits comprising two branch circuits, each of said branch circuits being connected between said input means of its channel circuit and said input means of the gating circuit of its channel circuit, one of said branch circuits in each of said channel circuits comprising a delay circuit, the other of said branch circuit in each of said channel circuits comprising a monostable multivibrator, means in the first of said channel circuits to restore pulses applied to the input means thereof to a desired polarity and reference voltage level, said output means of each of said gating circuits being the output means of each of said channel circuits, said input means of each subsequent channel circuit being connected to said output means of its immediately preceding channel circuit, and means in said one of said branch circuits to prevent feedback between the gating circuits of adjacent channel circuits.

3. A pulse amplitude analyzer comprising a plurality of channel circuits each having input means and a gating circuit, each of said gating circuits having input means and output means, said output means of each of said gating circuits being the output means of each of said channel circuits, said channel circuits being connected in series with each other, each of said channel circuits comprising two branch circuits, each of said branch circuits being connected between said input means of its channel circuit and said input means of the gating circuit of its channel circuit, one of said branch circuits in each of said channel circuits comprising a delay circuit, the other of said branch circuits in each of said channel circuits comprising a monostable multivibrator, means in the first of said channel circuits to restore pulses applied to the input means thereof to a desired polarity and reference voltage level, each of said monostable multivibrators in each of said other branch circuits being biased progressively in amount of voltage of one polarity, and a separate counting means connected to each of said other branch circuits between said monostable vibrator and said gating circuit.

4. In a pulse amplitude analyzer, for sorting and counting pulses with respect to their amplitudes, a plurality of channel circuits each having input means and a gating circuit, each of said gating circuits having input means and output means, each of said output means being the output means for its channel circuit, said channel circuits being connected to each other in series, each of said channel circuits comprising two branch circuits, each of said branch circuits being connected between the input means of its channel circuit and the input means of the gating circuit in its channel circuit, one of said branch circuits in each of said channel circuits comprising a delay circuit, and the other of said branch circuits in each of said channel circuits comprising a one-shot multivibrator.

5. In a pulse amplitude analyzer, for sorting and counting pulses with respect to their amplitudes, a plurality of channel circuits each having input means and a gating circuit, each of said gating circuits having input means and output means, each of said output means being the output means for its channel circuit, said channel circuits being connected to each other in series, each of said channel circuits comprising two branch circuits, each of said branch circuits being connected between the input means of its channel circuit and the input means of the gating circuit in its channel circuit, one of said branch circuits in each of said channel circuits comprising a delay circuit, the other of said branch circuits in each of said channel circuits comprising a one-shot multivibrator, and means in said one branch in the first of said channel circuits to restore pulses applied to the input means thereof to a desired polarity and reference voltage level.

6. In a pulse amplitude analyzer, for sorting and counting pulses with respect to their amplitudes, a plurality of channel circuits each having input means and a gating circuit, each of said gating circuits having input means and output means, each of said output means being the output means for its channel circuit, said channel circuits being connected to each other in series, each of said channel circuits comprising two branch circuits, each of said branch circuits being connected between the input means of its channel circuit and the input means of the gating circuit in its channel circuit, one of said branch circuits in each of said channel circuits comprising a delay circuit, the other of said branch circuits in each of said channel circuits comprising a one-shot multivibrator, and means in said one of said branch circuits to prevent feedback between the gating circuits of adjacent channel circuits.

7. A pulse amplitude analyzer comprising a plurality of channel circuits each having input means and output means, a gating circuit having input means in each of said channel circuits, said output means of each of said channel circuits being the output means of each of said gating circuits, said channel circuits being connected to each other in series, each of said channel circuits comprising two branch circuits connected between the input means of its channel circuit and the input means of its gating circuit, one of said branch circuits in each channel circuit comprising a delay circuit, each of the other of said branch circuits comprising a one-shot multivibrator progressively biased to be triggered by pulses greater than a predetermined amplitude and having means to provide a substantially squarewave voltage output of a time duration at least equal to the rise time of the triggering pulse plus the duration of said triggering pulse, said delay circuit comprising means to delay pulses applied thereto for a time equal to at least the rise time thereof, means in the first of said channel circuits to restore pulses applied to the input means thereof to a desired polarity and reference voltage level, and a separate counting means connected in parallel with each of said other of said branch circuits to count the pulses which trigger said multivibrator in each of said other of said branch circuits.

References Cited in the file of this patent

UNITED STATES PATENTS 2,552,013    Orpin _____ May 8, 1951